(12) United States Patent
Reichel et al.

(10) Patent No.: US 10,183,320 B2
(45) Date of Patent: Jan. 22, 2019

(54) METHOD FOR PRODUCING A MULTI-LAYER LARGE PIPE

(71) Applicants: Thilo Reichel, Siegen (DE); Ivan Aretov, Kreuztal (DE); Vitaliy Pavlyk, Hilchenbach (DE)

(72) Inventors: Thilo Reichel, Siegen (DE); Ivan Aretov, Kreuztal (DE); Vitaliy Pavlyk, Hilchenbach (DE)

(73) Assignee: EISENBAU KRAMER GMBH, Kreuztal (DE)

( * ) Notice: Subject to any disclaimer, the term of this patent is extended or adjusted under 35 U.S.C. 154(b) by 462 days.

(21) Appl. No.: 14/785,272

(22) PCT Filed: Mar. 26, 2014

(86) PCT No.: PCT/EP2014/056059
§ 371 (c)(1),
(2) Date: Oct. 16, 2015

(87) PCT Pub. No.: WO2014/170106
PCT Pub. Date: Oct. 23, 2014

(65) Prior Publication Data
US 2016/0082492 A1    Mar. 24, 2016

(30) Foreign Application Priority Data
Apr. 16, 2013  (DE) ........................ 10 2013 103 811

(51) Int. Cl.
*B23K 9/18* (2006.01)
*B21C 37/09* (2006.01)
*B21C 37/08* (2006.01)
*B21C 37/15* (2006.01)
(Continued)

(52) U.S. Cl.
CPC .......... *B21C 37/09* (2013.01); *B21C 37/0815* (2013.01); *B21C 37/154* (2013.01);
(Continued)

(58) Field of Classification Search
CPC ... B21C 37/09; B21C 37/0815; B21C 37/154; B23K 9/0253; B23K 9/18; B23K 31/027
(Continued)

(56) References Cited

U.S. PATENT DOCUMENTS 2,288,340 A    6/1942  Yates
5,657,922 A *  8/1997  Lowery ................. B21C 37/185
                                                            228/144

(Continued)

FOREIGN PATENT DOCUMENTS

DE           593 559 C      2/1934
DE    10 2013 103 811 B3    3/2014
(Continued)

OTHER PUBLICATIONS

Co-pending U.S. Appl. No. 15/317,350, Pavlyk et al., "Method for Producing a Large Multilayer Pipe," filed Dec. 8, 2016.
(Continued)

*Primary Examiner* — Brian Jennison
(74) *Attorney, Agent, or Firm* — Paulty Erickson & Kottis

(57) ABSTRACT

A method for producing a multilayer large pipe having an outer support layer and at least one inner liner layer. Advantages with regard to productivity and the properties of the multilayer large pipe are achieved by the sequence of method steps wherein production of a support sheet is pre-bent to a predetermined initial bending radius for the support layer and at least one liner sheet is pre-bent to a predetermined initial bending radius for the liner layer, placement of the at least one pre-bent liner sheet against the inside of the pre-bent support sheet, with a positioning and parallel alignment of its longitudinal edges extending in the direction of the bending axis in order to form the support layer and the at least one liner layer, there is integral joining of at least one of two longitudinal edges of the at least one
(Continued)

liner sheet to the support sheet, shaping of the composite of the integrally joined support layer and at least one liner layer to form a slit multilayer large pipe by a bending machine, with nonpositive, frictional engagement in liner regions that are not integrally joined, and there is closing of the remaining gap of the slit multilayer large pipe with a longitudinal seam by welding.

20 Claims, 3 Drawing Sheets

(51) Int. Cl.
    *B23K 9/025*     (2006.01)
    *B23K 31/02*     (2006.01)

(52) U.S. Cl.
    CPC .............. *B23K 9/0253* (2013.01); *B23K 9/18* (2013.01); *B23K 31/027* (2013.01)

(58) Field of Classification Search
    USPC .......................................................... 219/61
    See application file for complete search history.

(56) References Cited

U.S. PATENT DOCUMENTS

| | | |
|---|---|---|
| 9,156,074 B2 | 10/2015 | Beissel et al. |
| 2004/0020659 A1 | 2/2004 | Hall et al. |
| 2005/0082092 A1 | 4/2005 | Hall et al. |
| 2007/0022800 A1 | 2/2007 | Zifferer et al. |
| 2008/0264909 A1* | 10/2008 | Holdren ............... B23K 9/0284 219/61 |
| 2011/0146366 A1* | 6/2011 | Berg ....................... B21C 37/08 72/368 |

FOREIGN PATENT DOCUMENTS

| | | |
|---|---|---|
| EP | 1 857 194 A1 | 11/2007 |
| EP | 1 827 727 B1 | 5/2008 |
| EP | 2 285 508 B1 | 8/2011 |
| JP | 58-65524 A | 4/1983 |
| JP | S60 111791 A | 6/1985 |
| KR | 10-2010-0121016 A | 11/2010 |
| WO | WO 01/97996 A1 | 12/2001 |
| WO | WO 2004/103603 A1 | 12/2004 |
| WO | WO 2006/066814 A1 | 6/2006 |
| WO | WO 2010/145680 A1 | 12/2010 |

OTHER PUBLICATIONS http://www.butting.com, H. Butting GmbH & Co. KG, Knesebeck, Germany, "Production Process—hydroforming process," (No Date Available), 2 pages.

\* cited by examiner

METHOD FOR PRODUCING A MULTI-LAYER LARGE PIPE

BACKGROUND OF THE INVENTION

Field of the Invention

This invention relates to a method for producing a multilayer large pipe having an outer support layer and at least one inner liner layer.

Discussion of Related Art

A method for producing a multilayer large pipe through integral joining and nonpositive, frictional engagement between an outer support layer and an inner liner layer is disclosed in European Patent Office Reference EP 1 827 727 B1. In this case, a flat support sheet and a flat liner sheet are placed against each other and then a first connection between the material layers is produced. The material layers which are still resting against each other in a freely movable fashion are then shaped into the pipe with the aid of a bending roller with constant frictional contact between the material layers. After a certain amount of deformation progress, another connection is produced between the material layers so that they are connected to each other in at least one other location. Then, the multilayer pipe undergoes its final shaping with the help of the bending roller and/or a bending machine. After this, it is no longer possible to move the material layers relative to each other and the material layer serving as the inner pipe is pressed with nonpositive, frictional engagement into the material layer serving as an outer pipe. A method that is essentially similar in its production approach is also disclosed by European Patent Office Reference EP 2 285 508 B1, in which at least one of the material layers is composed of more than one applied element.

Other similar methods for producing a multilayer pipe are disclosed in PCT Reference WO 2006/066814 A1 and European Patent Office Reference EP 1 857 194 A1. In all of these methods, flat sheet metal plates for forming the layers are laid onto one another and then attached to each other in alternating fashion in a plurality of steps, the composite is subjected to a first bending process, the layers are tacked to one another again at another location after a certain amount of bending progress, and then bent further in order to produce the multilayer pipe, a process that requires a corresponding amount of production effort.

European Patent Office Reference EP 1 857 194 B1 also discloses a method for producing a multilayer pipe in which first, a flat, plate-shaped support sheet and a flat liner sheet are laid against one another. The support sheet or base sheet is provided with a preferably welded-on stop edge along both of its longitudinal edges or essentially parallel thereto, between which the liner plate is loosely inserted in order for the resulting multilayer material to then be shaped into a multilayer pipe with the help of a bending roller. The material layer serving as an inner pipe is clamped between the stop edges and in the final phase of the pipe shaping in the bending roller and/or a subsequently used bending machine, is pressed with nonpositive, frictional engagement into the material layer serving as the outer pipe. The embodiment of the stop edges and their positioning in accordance with the dimensions of the liner sheet constitute a not insignificant amount of effort in pipe production, and these steps do not achieve an integral connection.

There are also known multilayer large pipes, which are known as clad pipes, are metallurgically plated with a liner layer and are thus already embodied in special production steps in the production process of the plate. With this approach, the material selection is subjected to limits that are too strict for many applications.

SUMMARY OF THE INVENTION

One object of this invention is to provide a method for producing a multilayer large pipe of the type mentioned above, which along with an efficient production, also ensures advantageous adjustment possibilities for different applications.

This object and others are achieved according to this invention with a method having the following sequence of method steps: production of a support sheet that is pre-bent to a predetermined initial bending radius for the support layer and at least one liner sheet that is pre-bent to a predetermined initial bending radius for the liner layer; placement of the at least one pre-bent liner sheet against the inside of the pre-bent support sheet, with a positioning and parallel alignment of its longitudinal edges extending in the direction of the bending axis in order to form the support layer and the at least one liner layer; integral joining of at least one of the two longitudinal edges of the at least one liner sheet to the support sheet; shaping of the composite of the integrally joined support layer and at least one liner layer to form a slit multilayer large pipe by a bending machine, with nonpositive, frictional engagement in liner regions that are not integrally joined; and closing of the remaining gap of the slit multilayer large pipe with a longitudinal seam by welding.

These measures have significant advantages for productivity during production and for the design of the multilayer pipe. After the pre-bent support sheet and the at least one pre-bent liner sheet are integrally connected to each other, the bending process can be carried out through nonpositive, frictional engagement of the material layers. It is easily possible to use different bending machines such as a bending roller, a JCO bending press, or a UOE press, which are also used in conventional pipe production.

Contributions to the production of a good integral connection include the fact that in the method step of the integral joining, the edges of the at least one liner sheet that are circumferential with regard to the bending are also attached to the support sheet in at least some sections and/or an integral connection is produced by root penetration of the liner sheet. In tests, the inventor has demonstrated that the connection in the circumference direction, for example, a welded or soldered connection, has practically no negative impact on the process of producing the nonpositive, frictional connection between the support layer and the at least one liner layer.

Furthermore, the integral connection can be improved if a plurality of pre-bent partial liner sheets are placed against the inside, next to one another in the circumference direction and individually, are each integrally joined to the support sheet there, at least along their two longitudinal edges.

Also, the fact that partial liner sheets of different materials, different thicknesses, and/or different widths in the circumference direction are used achieves advantageous design possibilities of the multilayer large pipe for meeting different requirements.

The production and design are also facilitated in that the initial bending radii of the inside of the support sheet and the outside of the at least one liner sheet are selected to be the same size.

A high-quality nonpositive, frictional connection is facilitated by the fact that the initial bending radii are at least twice as large as the radius of the large pipe when the bending is complete.

A high-quality production is facilitated if the initial bending radii of the support sheet and the at least one liner sheet are selected to be large enough to prevent a bulging or creasing as the integral composite of the support layer and the at least one liner layer is shaped into the slit large pipe.

A high stability of the multilayer large pipe is achieved if the initial bending radii are selected to produce a swaging of the at least one liner sheet during the shaping into the slit large pipe.

Contributions to an advantageous design and high quality also include the fact that at least one liner sheet is selected, which is made of a material that has a higher yield strength than the support sheet.

A more stable design of the multilayer large pipe is also facilitated if as the integral composite of the support layer and liner layer is shaped into the slit large pipe, the swaging boundary of the at least one liner sheet is intentionally exceeded by a predetermined dimension.

Advantages for the production and design of the large pipe are also achieved if the gap that remains in the slit large pipe after the forming is closed in such a way that the support pipe produced from the support layer is welded by a submerged arc welding process, whereupon the resulting inner welding seam is covered by a deposition welding method with an alloy of the same type or with an alloy that is compatible with the material of the liner layer.

BRIEF DESCRIPTION OF THE DRAWINGS

This invention is explained in greater detail below in view of exemplary embodiments shown in the drawings, wherein.

DETAILED DESCRIPTION OF THE INVENTION

Figure 1A:
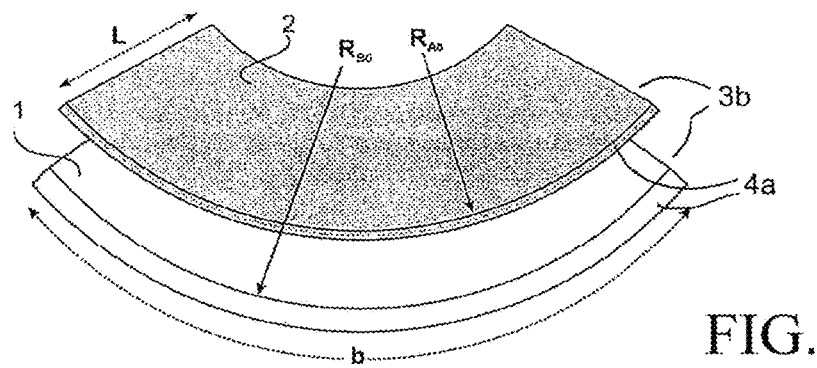
FIGS. 1a through 1c show perspective views of different method steps in the production of a multilayer large pipe according to a first exemplary embodiment of this invention.
Figure 1B:
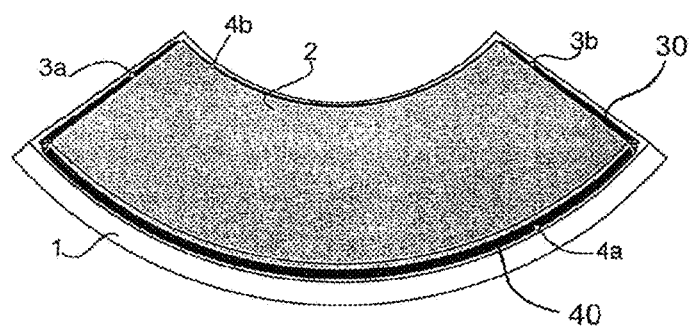
Figure 1C:
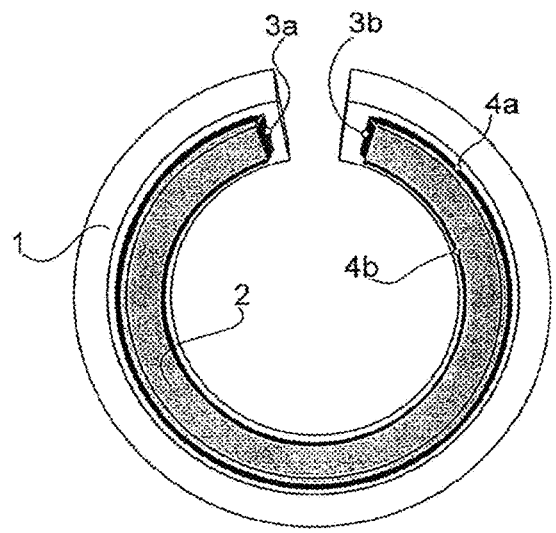

Partial views of FIGS. 1a-1c show different method steps in the production of a multilayer large pipe. The term "large pipe" is understood to include pipes with diameters of at least 200 mm and a total wall thickness of at least 5 mm. The multilayer large pipe (multilayer pipe) has an outer material layer that constitutes or forms an outer pipe body and that functions as a support layer 1, sometimes also referred to as the base layer or substrate, and at least one inner material layer or liner layer 2 that constitutes or forms an inner pipe body, sometimes also referred to as the liner. In all of the exemplary embodiments, the support layer 1 extends over the entire circumference of the multilayer pipe except for a longitudinal seam (not shown), which is produced between the edges that are oriented toward each other in the finished pipe and which is preferably embodied as a longitudinal welding seam. In the exemplary embodiment shown in FIG. 1, in the finished multilayer pipe, the liner layer 2 likewise extends around the entire inner circumference except for a connecting seam. Alternatively, it can also extend over only a part of the inner circumference.

As the partial view in FIG. 1a shows, the support layer 1 and the liner layer 2, of which there is only one in the present exemplary embodiment, are embodied in the form of a pre-bent support sheet and pre-bent liner sheet made of metallic material. The pre-bent support sheet or support layer 1 in the pre-bent initial state has an initial bending radius $R_{B0}$ and the pre-bent liner sheet or the liner layer 2 that is produced from it has an initial radius $R_{A0}$. In the circumference or circumferential direction, the support sheet and the liner sheet extend essentially, with the possible exception of a slightly smaller dimension of the liner sheet due to the smaller inner circumference, across the entire sheet width b and extend across a sheet length L in the direction of the bending axis or longitudinal axis of the finished pipe. The support sheet and the liner sheet have longitudinal edges 3a and 3b in the longitudinal direction and circumferential edges 4a and 4b in the circumference direction. As the partial view in FIG. 1b shows, the support sheet and liner sheet are connected to each other along their longitudinal edges 3a, 3b and 4a, 4b that are oriented toward each other by an integral connection 30 in the longitudinal direction and in the exemplary embodiment shown, are also connected to each other in the circumference direction by an integral connection 40 along their circumferential edges 4a, 4b. The integral connections are preferably embodied in the form of a welded connection or soldered connection. In this way, the support sheet that constitutes or forms the support layer 1 and liner sheet that constitutes or forms the liner layer 2 are integrally joined to each other along the edges and over a part of their surface in the pre-bent initial state and form a multilayer composite that is then shaped to produce a completely bent slit pipe, as schematically shown in the partial view in FIG. 1c. During the shaping of the multilayer composite, after the integral joining process, which can also be carried out only partially along the two longitudinal edges and possibly circumferential edges, a nonpositive, frictional connection of the remaining area is produced between the support layer 1 and the liner layer 2.

The pre-bent support sheet and the independently pre-bent liner sheet are provided and, for example, already delivered in the pre-bent state and are then placed against each other in the above-mentioned way with their longitudinal edges 3a, 3b and circumferential edges 4a, 4b aligned with one another. In this case, the initial bending radii are always larger than the final radius of the finished multilayer pipe, but in any case are in the end embodied so that over the remaining area, a nonpositive, frictional connection is produced during the shaping of the composite into the multilayer pipe.

Before the welding or soldering along the longitudinal edges 3a, 3b and possibly also the edges 4a, 4b extending in the circumference direction, the liner material constituting or forming the liner layer 2 can be affixed to the support layer 1 by weld-tacking, soldering, gluing, or mechanical clamping.

The pre-bending of the two sheet metal partners constituting or forming the support layer 1 and the liner layer 2 before they are attached to each other serves to make it possible in the first place to perform further bending after the production of the integral connection along the longitudinal edges 3a, 3b and possibly along the edges 4a, 4b of the liner layer extending in the circumference direction, such as in the composite, to the final radius of the finished multilayer pipe. The initial bending radius of the support layer 1 and of the (at least one) liner layer 2 is selected to be small enough that during the additional bending process of the pre-bent sheet metal partners that were previously only permanently affixed to each other at the edges, which process is carried out until the slit pipe is completed, the liner layer 2, which is usually significantly thinner than the support layer 1, is prevented from bulging above the underlying support layer 1 or a creasing in the liner layer 2 is prevented. The bulging or creasing in the thinner liner layer 1 can be caused by it being swaged during the mutual bending of the composite made up of the sheet metal partners that are only affixed to each other at the edges, because the swaging can result in a loss of stability. The swaging in the circumference direction of the multilayer pipe is inevitable and occurs due to the smaller radius of the inner wall of the multilayer pipe in comparison to the outer radius, which causes a stretching to occur during the bending.

The pre-bending of the support sheet and the liner sheet(s) can also take place independently of each other, for example it can already take place at the supplier. Various known bending methods can be used for this, such as three-roller bending, a JCO press, or a U press. In one embodiment of this invention, a roller device is used for the pre-bending of the liner sheet, which is relatively thin compared to the support sheet, and produces the pre-bent sheets or sheet strips from a coil.

During the shaping of the composite, which is produced from the support layer 1 and the at least one liner layer 2 with the integral connection along the edges, the liner layer 2 is swaged in the tangential direction. The resulting tangential compressive stress produces a normal stress, which presses the at least one liner layer 2 against the support layer 1. This produces a nonpositive, frictional connection of the two sheet metal partners to each other in addition to the integral connection along the edges. The intensity of the contact pressure increases with the increase in the compressive deformation, which is due to the strain hardening of the material of the liner layer(s) 2. The degree of swaging that is achieved at the end of the bending during the shaping of the multilayer pipe to the final diameter depends on the initial bending radii of the sheet metal partners. The greater the initial bending radius is, the greater the compressive stress. As a result, a greater effectiveness of the nonpositive, frictional connection between the support layer 1 and the (at least one) liner layer 2 in the finished pipe is achieved.

In one embodiment of this invention, the maximum possible initial bending radius is selected, which permits yet another safe bending of the composite during the shaping of the two sheet metal partners, without causing a bulging or creasing of the liner layer 2. The initial bending radius established in this way simultaneously leads to the maximum possible nonpositive, frictional connection of the two sheet metal partners in the finished multilayer pipe. It depends on the thickness of the sheets composing the support layer 1 and the at least one liner layer 2, whose mechanical properties, such as modulus of elasticity, swaging flow boundary, hardening, and the like, and also depends on the bending equipment and the selected bending process parameters as well as the friction properties of the cooperating surfaces of the support layer 1 and liner layer 2. The bending radius can be determined empirically and/or through calculation by discovered model parameters.

The shaping of the composite of the two sheet metal partners after the integral connection is produced along their edges can be carried out with various suitable methods. These include among other things a three-roller bending machine, a JCO press, or a UOE press. The critical pre-bending radius with which the shaping can be performed without a bulging of the liner layer 2, can be different for each selected method and is determined, for example, in preliminary testing.

An initial bending radius that is as large as possible is preferable, which is for example at least twice as large as the final radius of the multilayer pipe and in addition, permits free access to all sheet metal edges from above. This facilitates weld production, weld seam inspections, and if need be, necessary repairs during production.

After the shaping of the composite into the final bent slit pipe, the remaining gap is closed in a tacking machine. The multilayer pipe thus prepared is then further welded along its longitudinal edges that are oriented toward each other, similar to the way in which this is also customarily done for metallurgically plated clad pipes. In order to weld the support pipe formed by the support layer 1, usually a submerged arc welding process is used, followed by covering the inner weld seam by a deposition welding method with an alloy of the same type or with an alloy that is compatible with the liner material.

In another embodiment of this invention, the support sheet and the at least one liner sheet are pre-bent so that the inner radius of the support sheet and outer radius of the adjoining liner sheet are the same size. This minimizes the gap between the two sheet metal partners resting against each other and achieves a virtually gap-free connection between the two edges 4a, 4b of the liner sheet extending in the circumference direction before the shaping of the composite composed of the support layer 1 and the at least one liner layer 2 to the final radius of the multilayer pipe. This achieves an additional important advantage in that the residual gap still remaining right next to the connecting seam in the region of or near the circumferential edges is closed in the course of the shaping due to the pressure of the bending tool. This is particularly important for the quality of finished multilayer pipes in which the gap between the liner layer 2 and the support layer 1 must be reduced to a minimum.

In another embodiment of this invention, the longitudinal edges 3a, 3b of adjacent regions of the support sheet or support layer 1 and corresponding regions of the liner sheet or liner layer 2 are additionally bent to the final radius of the multilayer pipe. The remaining area of the support sheet and the liner sheet or of the relevant layers still has the larger initial bending radius. This can occur before the composite, which is produced by the integral connection, is shaped to the final radius of the multilayer pipe. It is also possible for there to be a subsequent bending of the longitudinal edges after the multilayer pipe has largely been shaped to the final radius and the longitudinal seam welding for closing the slit pipe is imminent.

Figure 2A:
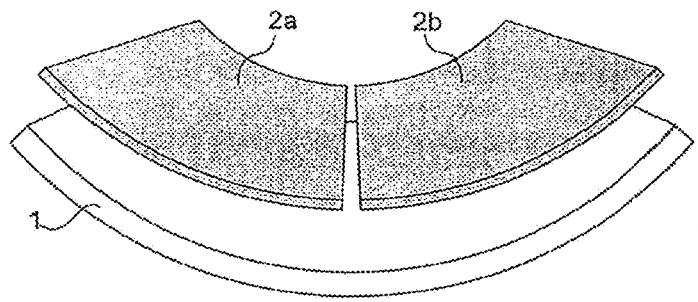
FIGS. 2a through 2c show a plurality of successive method steps for the production of a multilayer large pipe according to a second exemplary embodiment of this invention.
Figure 2B:
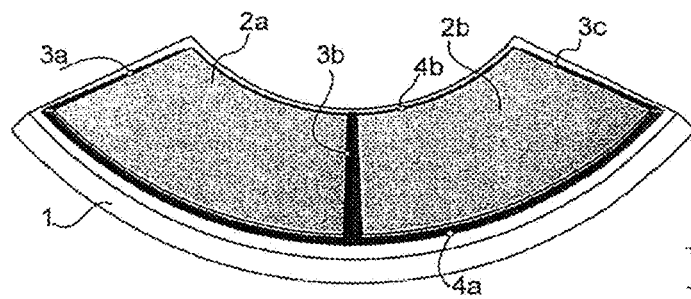
Figure 2C:
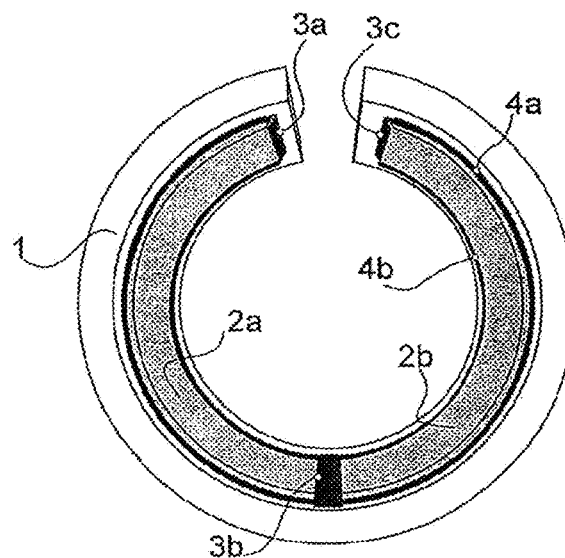
Figure 3A:
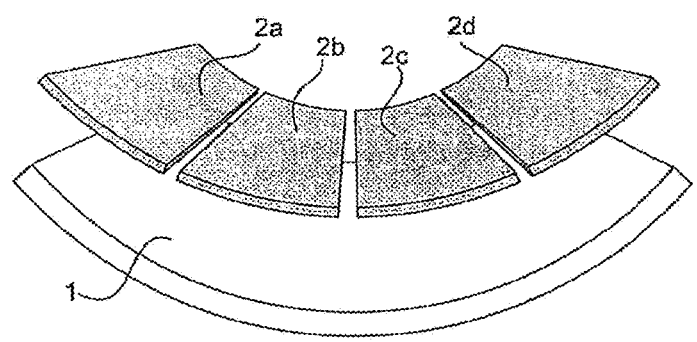
FIGS. 3a through 3c show a plurality of method steps of yet another exemplary embodiment for the production of a multilayer large pipe.
Figure 3B:
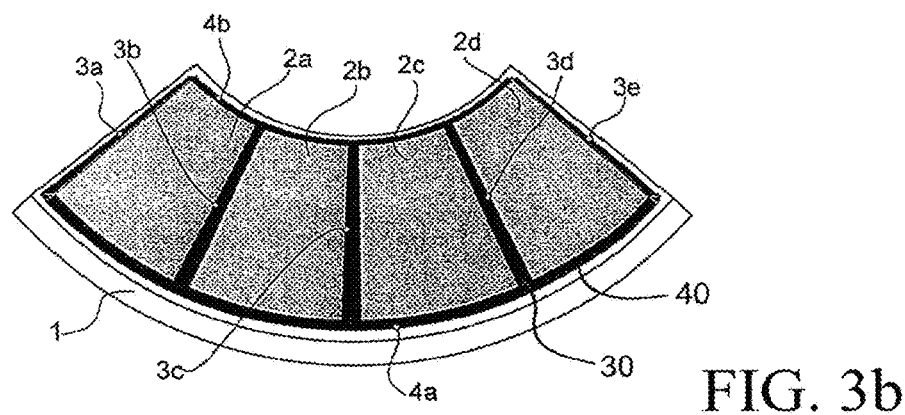
Figure 3C:
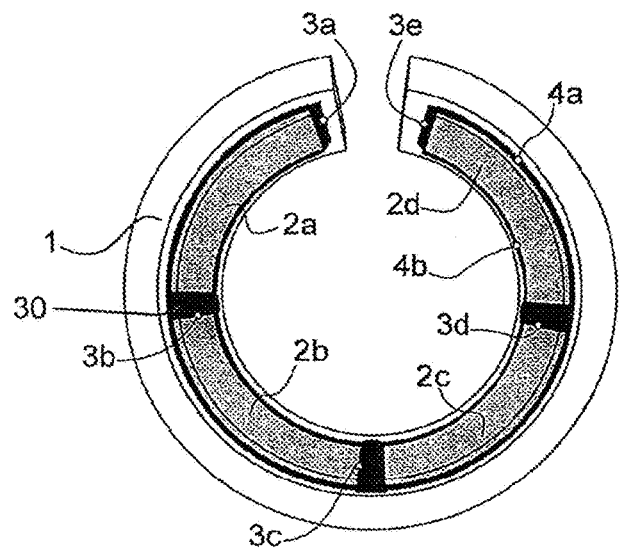

The number of liner sheets that compose a liner layer 2 in the circumference direction does not have to be limited to a single one-piece liner sheet, as shown in FIG. 1 but can instead be composed of a plurality of partial liner sheets or partial liner layers positioned next to one another in the circumference direction, for example two (see FIG. 2), three, four (see FIG. 3), and even more liner sheets, depending on the application field and the requirements of the connection between the liner layer 2 and the support layer 1. In this case, each additional integral connection along the additional longitudinal edges 3c), 3d) in the form of connecting seams increases the bonding between the support layer 1 and the liner layer 2 in comparison to a more nonpositive, frictional connection that is still produced between the seams. By varying the number of partial liner layers and the number of seams for the integral connection, it is possible to achieve a scalability of the entire bonding concept.

The partial liner layers can have the same or different widths. It is thus possible, even for different diameters of the finished multilayer pipe, to partially use standardized strips of the same or different widths of partial liner layers.

In the embodiment in which the liner layer is composed of two or more partial liner sheets or partial liner layers in the circumference direction, the weld seams, which produce the integral connection and are situated between the partial liner sheets that still rest against the support sheet in the pre-bent state, are welded, inspected, and if necessary repaired and ground to the required degree so that after the multilayer pipe is closed to form the slit pipe or after the production of the longitudinal weld seam on the inside of the slit pipe or multilayer pipe, no further welding is required. A deposition welding in the region of or near the liner layer 2 or between its partial liner layers, the inspection of the deposition welding, and if necessary the repair thereof are facilitated by an initial bending radius that is as large as possible, which is at least twice as large as the final radius of the multilayer pipe and consequently permits free access to the welding sites.

In another embodiment, additional integral connections are produced between the support layer 1 and the liner layer 2 by additional weld seams or weld points, which are produced by a root penetration of the liner material.

In another embodiment of this invention, the regions of the support sheet adjoining the longitudinal edges in the circumference direction remain straight after the pre-bending. The pre-bent liner sheets are positioned only up to the shoulder of the straight regions that transitions into the rounded region and are integrally joined to the support sheet along their edges. After completion of the shaping of the composite into a slit pipe, the remaining straight sections of the support sheet or support layer 1 are cut along the longitudinal edge of the liner sheet so that a slit pipe without straight sections in the edge region in the circumference direction and consequently a round multilayer pipe is obtained.

In another embodiment of this invention, the liner layer 2 does not completely cover the support layer 1 in the circumference direction so as to form a flute by a semicircle.

If the liner layer 2 is composed of a plurality of partial liner layers segmented in the circumference direction, then the partial liner layers or segments can be made of different materials and/or can also have different wall thicknesses. This permits the multilayer pipe to be optimized in an application-specific way. It is thus possible for regions of the multilayer pipe that are exposed to different amounts of corrosion, wear, and the like to be respectively covered with appropriate corrosion-resistant or wear-resistant materials.

In its different variants, the above-described method makes it possible to use materials of the liner layer 2 that have a higher yield strength in comparison to the material of the support layer 1 when producing multilayer large pipes. This offers a greater advantage relative to the liner pipes produced in known ways by hydroforming, when the liner material must have a lower yield strength so that after the expansion of the inner and outer pipe and the final mutual shrinkage of the two pipes, a nonpositive, frictional connection is produced.

The invention claimed is:

1. A method for producing a multilayer large pipe having an outer support layer (1) and at least one inner liner layer (2), including the sequence of method steps:

producing a support sheet pre-bent to a predetermined initial bending radius ($R_{BO}$) for the outer support layer (1) and separately producing at least one liner sheet pre-bent to a predetermined initial bending radius ($R_{AO}$) for the liner layer (2), each of the support sheet and the at least one liner sheet having an outer surface and an inside surface opposite the outer surface, the inner and outer surfaces extending between two longitudinal edges;

placing the outer surface of the at least one pre-bent liner sheet against the inside surface of the pre-bent support sheet, with a positioning and parallel alignment of the two longitudinal edges of each of the at least one pre-bent liner and the pre-bent support sheet extending in a direction of the bending axis to form the outer support layer (1) and the at least one liner layer (2);

integrally joining at least one of the two longitudinal edges (3a, 3b, 3c, 3d) of the at least one liner sheet to the support sheet;

shaping the composite of the integrally joined support layer (1) and at least one liner layer (2) to form a slit multilayer large pipe by a bending machine, with nonpositive, frictional engagement in liner regions not integrally joined; and closing the remaining gap of the slit multilayer large pipe with a longitudinal seam by welding.

2. The method according to claim 1, wherein in the integral joining, the edges (4) of the at least one liner sheet that are circumferential with regard to a bending are also attached to the support sheet (1) in at least some sections and/or an integral connection is produced by root penetration of the liner sheet.

3. The method according to claim 2, wherein a plurality of pre-bent partial liner sheets are placed against the inside, next to one another in a circumference direction and individually, are each integrally joined to the support sheet at least along the two longitudinal edges.

4. The method according to claim 3, wherein a portion of the liner sheets have different materials, different thicknesses, and/or different widths in the circumference direction.

5. The method according to claim 4, wherein the initial bending radii ($R_{BO}$, $R_{AO}$) of the inside of the support sheet and the outside of the at least one liner sheet are the same size.

6. The method according to claim 5, wherein the initial bending radii ($R_{BO}$, $R_{AO}$) are at least twice as large as the radius of the large pipe when the bending is complete.

7. The method according to claim 6, further comprising selecting the predetermined initial bending radii ($R_{BO}$, $R_{AO}$) of the support sheet and the at least one liner sheet as large enough to prevent a bulging or creasing as the integral composite of the support layer (1) and the at least one liner layer (2) is shaped into the slit large pipe.

8. The method according to claim 7, further comprising selecting the predetermined initial bending radii ($R_{BO}$, $R_{AO}$) to produce a swaging of the at least one liner sheet during the shaping into the slit large pipe.

9. The method according to claim 8, wherein at least one liner sheet is made of a material that has a higher yield strength than the support sheet.

10. The method according to claim 9, wherein as the integral composite of the support layer (1) and liner layer (2) is being shaped into the slit large pipe, the swaging boundary of the at least one liner sheet is intentionally exceeded by a predetermined dimension.

11. The method according to claim 10, wherein the gap that remains in the slit large pipe after the forming is closed so that the support pipe produced from the support layer (1) is welded by a submerged arc welding process, where the resulting inner welding seam is covered by a deposition welding method with an alloy of the same type or with an alloy that is welding compatible with a material of the at least one inner liner layer (2).

12. The method according to claim 1, wherein a plurality of pre-bent partial liner sheets are placed against the inside, next to one another in a circumference direction and individually, are each integrally joined to the support sheet at least along the two longitudinal edges.

13. The method according to claim 12, wherein a portion of the liner sheets have different materials, different thicknesses, and/or different widths in the circumference direction.

14. The method according to claim 1, wherein the initial bending radii ($R_{B0}$, $R_{A0}$) of the inside of the support sheet and the outside of the at least one liner sheet are the same size.

15. The method according to claim 1, wherein the initial bending radii ($R_{B0}$, $R_{A0}$) are at least twice as large as the radius of the large pipe when the bending is complete.

16. The method according to claim 1, further comprising selecting the predetermined initial bending radii ($R_{B0}$, $R_{A0}$) of the support sheet and the at least one liner sheet as large enough to prevent a bulging or creasing as the integral composite of the support layer (1) and the at least one liner layer (2) is shaped into the slit large pipe.

17. The method according to claim 1, further comprising selecting the predetermined initial bending radii ($R_{B0}$, $R_{A0}$) to produce a swaging of the at least one liner sheet during the shaping into the slit large pipe.

18. The method according to claim 1, wherein at least one liner sheet is made of a material that has a higher yield strength than the support sheet.

19. The method according to claim 1, wherein as the integral composite of the support layer (1) and liner layer (2) is being shaped into the slit large pipe, the swaging boundary of the at least one liner sheet is intentionally exceeded by a predetermined dimension.

20. The method according to claim 1, wherein the gap that remains in the slit large pipe after the forming is closed so that the support pipe produced from the support layer (1) is welded by a submerged arc welding process, where the resulting inner welding seam is covered by a deposition welding method with an alloy of the same type or with an alloy that is welding compatible with a material of the at least one inner liner layer (2).

* * * * *